Figure 1:
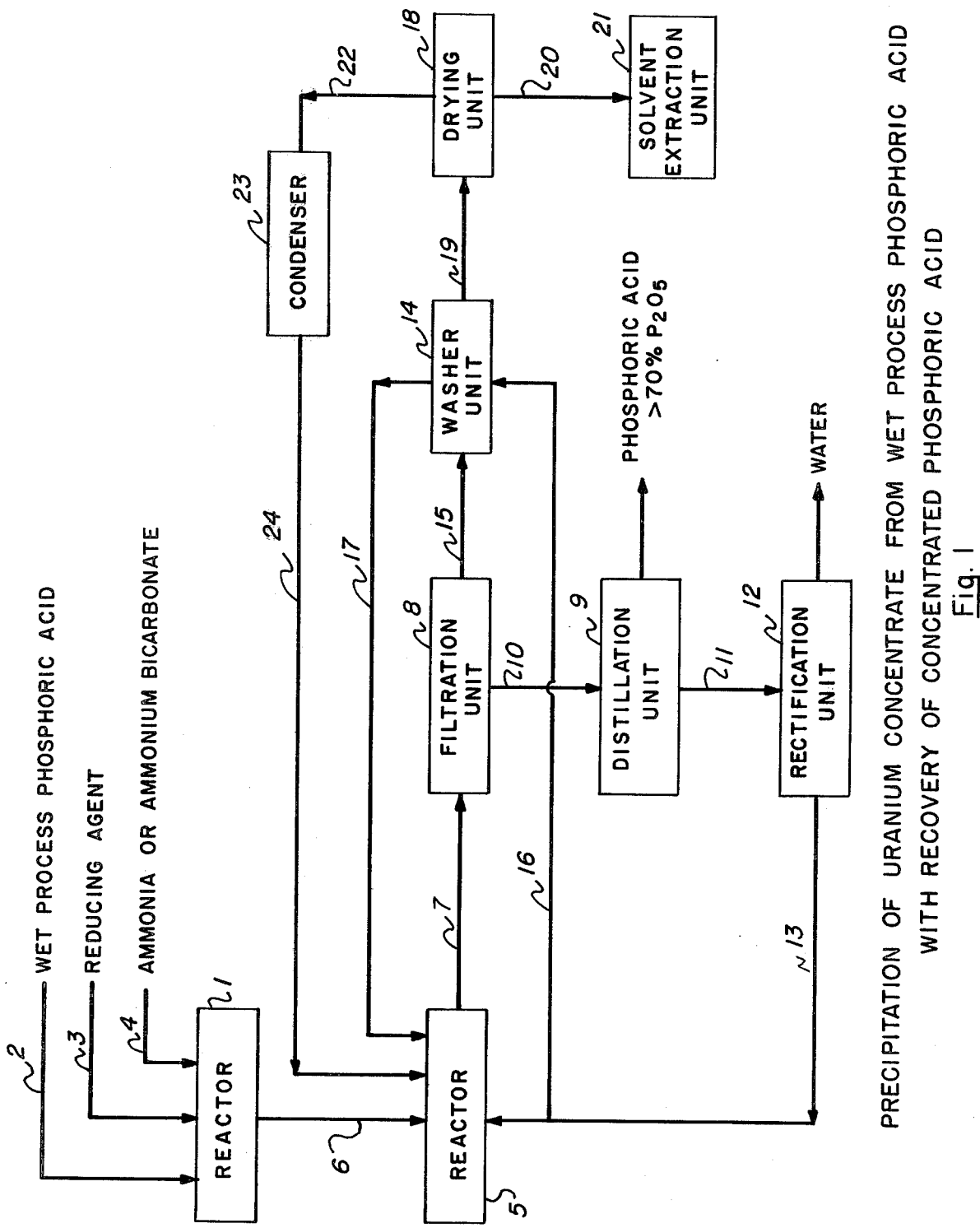

United States Patent [19]

McCullough et al.

[11] 4,180,545
[45] Dec. 25, 1979

[54] URANIUM RECOVERY FROM WET-PROCESS PHOSPHORIC ACID

[75] Inventors: John F. McCullough; John F. Phillips, Jr.; Leslie R. Tate, all of Florence, Ala.

[73] Assignee: Tennessee Valley Authority, Muscle Shoals, Ala.

[21] Appl. No.: 827,517

[22] Filed: Aug. 25, 1977

Related U.S. Application Data

[63] Continuation of Ser. No. 781,216, Mar. 25, 1977, now Defensive Publication No. T970,007.

[51] Int. Cl.² ............................................. C01G 43/00
[52] U.S. Cl. ......................................... 423/8; 423/10; 423/11; 423/15
[58] Field of Search ........................ 423/10, 15, 8, 11

[56] References Cited

U.S. PATENT DOCUMENTS

| | | | |
|---|---|---|---|
| 2,860,031 | 11/1958 | Grinstead | 423/10 |
| 3,835,214 | 9/1974 | Hurst et al. | 423/15 |
| 3,880,980 | 4/1975 | Wamser | 423/15 |
| 3,961,027 | 6/1976 | Crossley | 423/15 |
| 3,966,873 | 6/1976 | Elikan et al. | 423/15 |
| 3,975,178 | 8/1976 | McCullough et al. | 71/34 |
| 4,002,716 | 1/1977 | Sundar | 423/15 |

Primary Examiner—Edward A. Miller
Attorney, Agent, or Firm—Robert A. Petrusek

[57] ABSTRACT

A method of recovering uranium from wet-process phosphoric acid wherein the acid is treated with a mixture of an ammonium salt or ammonia, a reducing agent, and then a miscible solvent. Solids are separated from the phosphoric acid liquid phase. The solid consists of a mixture of metal phosphates and uranium. It is washed free of adhering phosphoric acid with fresh miscible solvent. The solid is dried and dissolved in acid whereupon uranium is recovered from the solution. Miscible solvent and water are distilled away from the phosphoric acid. The distillate is rectified and water discarded. All miscible solvent is recovered for recycle.

5 Claims, 2 Drawing Figures

PRECIPITATION OF URANIUM CONCENTRATE FROM WET PROCESS PHOSPHORIC ACID
WITH RECOVERY OF CONCENTRATED PHOSPHORIC ACID

PRECIPITATION OF URANIUM CONCENTRATE FROM WET PROCESS PHOSPHORIC ACID WITH RECOVERY OF CONCENTRATED PHOSPHORIC ACID

EFFECT OF SULFURIC ACID CONCENTRATION ON
METHANOL PRECIPITATED CAKE DISSOLUTION

URANIUM RECOVERY FROM WET-PROCESS PHOSPHORIC ACID

The invention herein described may be manufactured and used by or for the Government for governmental purposes without the payment to us of any royalty therefor.

This is a continuation of our copending application Ser. No. 781,216, filed Mar. 25, 1977, for URANIUM RECOVERY FROM WET-PROCESS PHOSPHORIC ACID now Defensive Publication No. T970,007.

Our invention relates to a method of separating and isolating uranium from phosphoric acid; more particularly it relates to a process whereby uranium is coprecipitated along with metal phosphates from wet-process phosphoric acid by addition of ammonia or an ammonium salt, methanol, and a reducing agent; and still more particularly it relates to a process whereby the uranium is recovered in a concentrated form as a solid which is well suited for further concentration and purification by conventional solvent extraction techniques.

Uranium oxide, $U_3O_8$, or yellow cake as it is often called, is used primarily for electric power production. All forecasts show the demand for yellow cake will increase during the remainder of this century [Hogerton, J. F., *Nucl. News* 19 (8), 73–76 (1976); Gordon, Emanuel, *Eng. and Min. J.* 176 (3), 213–217 (1975); *Electr. World* 107 (4), 30–33 (1975)].

There is considerable doubt about the ability of U.S. domestic reserves to satisfy this demand [*Min. Congr. J.* 62 (1), 14 (1976); Lieberman, M. A., *Sci.* 192, 431–436 (1976); *Electr. World* 107 (4), 30–33 (1975); *Energy Resources Report* 4 (28), 272 (1976)] and, therefore, it is prudent to look for alternate yellow cake sources.

One such source is wet-process phosphoric acid. The uranium in the phosphoric acid is derived from that contained in the phosphate rock raw material. The uranium content in domestic phosphate rock ranges from a low of 12 mg/Kg rock to as high as 399 mg/Kg rock [Menzel, R. G., *J. Agric. Food Chem.* 16 (2), 231 (1968)]. The uranium concentration in the phosphate ore bodies now actively mined is about 125 mg/Kg. U.S. phosphate rock reserves minable by present technology are estimated to be near five billion tons and, therefore, the potentially recoverable uranium is near 625,000 tons. Not all phosphate rock is converted to wet-process acid, but nevertheless, the uranium in this rock represents an impressively large potential uranium reserve.

When phosphate rock is converted to wet-process phosphoric acid by sulfuric acid acidulation, much of the valuable uranium in the rock passes into the phosphoric acid. Although the initial oxidation state of the uranium is variable, air oxidation may convert some of the uranium (IV) to U(VI), the uranyl form. The initial product acid produced by the wet-process method contains about 32 percent $P_2O_5$ and is known as filter-grade acid. The uranium concentration in the filter-grade acid generally lies in the range of 0.1 to 0.2 g/l [Hurst, F. J. and Crouse, D. J., *Ind. Eng. Chem. Process Des. Develop.* 13 (3), 286–291 (1974)].

Filter-grade acids are frequently concentrated by evaporation up to 54 percent $P_2O_5$ and are then known as merchant-grade acids. Further concentration to 70 percent $P_2O_5$ produces superphosphoric acids. Acids made from rock which has been calcined at high temperature are known as green wet-process acids. Acids made from uncalcined rock are black and more objectionable because they contain partially decomposed organic material derived from the rock; however, because their production does not require energy input for a calcining operation their costs are substantially lower.

The 1976 wet-process acid production was $6.88 \times 10^6$ tons $P_2O_5$ (*Fert. Trends* 1977). This wet-process acid contained approximately 3,000 tons of yellow cake and represents 30 percent of current U.S. yellow cake demand which in 1975 was 10,000 tons [Hogerton, J. F., *Nucl. News* 19 (8), 73–76 (1976)]. The magnitude of this uranium source, coupled with the recent dramatic uranium price increase, has greatly stimulated interest in uranium recovery from phosphoric acid.

Prior art shows that solvent extraction with organophosphates is a preferred method of recovering uranium from wet-process acid. Capryl pyrophosphate [Cronan, C. S., *Chem. Eng.* 66 (9), 108–111 (1959)] as well as octyl, amyl, and butyl pyrophosphate esters (Long, R. S., U.S. Pat. No. 2,882,123) were used for this purpose but have since been abandoned because the esters proved to be very unstable and easily decomposed.

Hurst and Crouse [*Ind. Eng. Chem. Process Des. Develop.* 11 (1), 122–128 (1972)] of Oak Ridge National Laboratory have developed and tested on a small scale a uranium solvent extraction process which uses two extraction cycles with a mixture of di-(2-ethylhexyl) phosphoric acid and tri-n-octylphosphine oxide dissolved in kerosene. These same workers [Ibid, 13 (3), 286–291 (1974)] later developed a similar two-cycle extraction process which uses a mixture of mono- and dioctylphenylphosphoric acids dissolved in kerosene for the first extraction cycle followed by di-(2-ethylhexyl) phosphoric acid and tri-n-octylphosphine oxide in the second cycle.

Several commercial solvent extraction units are also in operation on a limited scale [Ross, R. C., *Eng. Min. J.* 176 (12), 80–85 (1975)]. Although exact details of these processes are not available, they are believed to be based on technology developed at Oak Ridge, supra.

The aforementioned solvent extraction processes have several disadvantages and defects. As noted, black wet-process acid contains a complex array of rock-derived organic materials. Because these organics emulsify the extractant, their presence in black acid delays or prevents phase disengaging and thus causes losses of the valuable extractant to the acid raffinate. Therefore, all black acid extraction processes must employ an acid cleanup step prior to uranium extraction. In spite of this cleanup step, some of the expensive extractant and its kerosene diluent is inevitably lost to the acid where it may subsequently attack the rubber lining of some process vessels or cause foaming during the concentration of filter-grade acid to merchant-grade. Although these difficulties do not occur when green acids are used, green acids, unfortunately, comprise a small portion of total acid production and often contain less uranium (Hurst, F. J. and Crouse, D. J., 1974, supra).

The inability of these solvent extraction processes to successfully treat the more concentrated merchant-grade phosphoric acids constitutes another disadvantage. The requirement that dilute filter-grade acid be used means that large volumes of expensive solvent extraction reagents are required.

Prior art also teaches that precipitation methods may be used to directly recover uranium from phosphoric acid. Generally, in these precipitation methods, phosphate rock is leached with dilute sulfuric acid to yield a phosphoric acid extract containing, more or less, 20 to 25 percent $P_2O_5$. In most methods, this dilute extract is neutralized prior to or during uranium precipitation. Use of this technique destroys the phosphoric acid by converting it to a less valuable phosphate salt. A few practitioners of the art seem to be able to precipitate uranium without destroying the phosphoric acid.

These precipitation methods have several serious disadvantages. They have been applied only to dilute phosphoric acid. They frequently consume an excessive amount of raw materials and they yield either a phosphate salt coproduct or a phosphoric acid which is not appreciably more pure than the initial acid raw material.

Thus, Y. Shiraishi [Japanese Pat. No. 8853 (57)] leaches phosphate rock with dilute $H_2SO_4$ (1–2 N) in an autoclave and obtains a dilute $H_3PO_4$ extract. This inventor then adds HF to the extract to precipitate thorium and rare earth metals from the extract. Following filtration of these metal fluorides, Shiraishi neutralizes the phosphoric acid extract with sodium hydroxide or ammonia to precipitate $Na_2U_2O_7$ or $(NH_4)_2U_2O_7$, respectively. The inventor further purifies this salt with several cycles of sulfuric acid dissolution followed by sodium carbonate precipitation. The inventor claims that the uranium free phosphate extract might be used as a fertilizer product.

Metzinger, et. al., (U.S. Pat. No. 2,743,156) also leaches phosphate rock with sulfuric acid (25 percent), then oxidizes the dissolved uranium with chlorine or sodium chlorate. He then neutralizes the reaction mixture to pH 3.5 to 4.5 with sodium carbonate and filters the gypsum and unreacted rock away from the sodium phosphate extract. Two filtrations are required. Diatomaceous earth and $Na_2S_2O_4$ are added to precipitate uranium.

Yoshihito, et. al., [Japanese Pat. No. 4703 (57)] recover uranium from phosphoric acid by neutralizing the acid to pH 3.6 with calcium hydroxide. The inventors filter off the precipitate, then precipitate uranium from the filtrate with tannic acid. They then completely neutralize the uranium-depleted phosphoric acid solution with additional calcium hydroxide and obtain a dicalcium phosphate coproduct.

Bailes, et. al., (U.S. Pat. No. 2,873,165) precipitate uranium from filter-grade acid by first adding iron to reduce U(VI) to U(IV). They then add aqueous hydrogen fluoride and solid calcium carbonate to the acid which causes a voluminous precipitate to form. The inventors leach uranium from the precipitate with sulfuric acid at elevated temperature. Unlike previous methods, this invention recovers phosphoric acid. However, about 20 percent of the added hydrofluoric acid is lost to this acid, making it unsuitable for fertilizer products.

Amatsu, et. al., [Japanese Pat. No. 2457 (57)] have devised a precipitation method whereby they add powdered aluminum to the acid, causing a uranium-free precipitate to form. The inventors filter this off, then cool the filtrate to 5° C. They add cupferron to the cold filtrate causing uranium to precipitate. Uranium recovery is 83 percent.

This method of Amatsu also allows recovery of phosphoric acid coproduct. However, the method requires multiple filtration and extensive refrigeration of the dilute filter-grade acid. Filtration of the cold acid should be especially difficult because the acid is quite viscous at 5° C. The recovered acid is still impure (except for uranium removal) and uranium recovery is less than complete.

Igelsrud, et. al., (BMI-JDS-201 Battelle Memorial Institute, 1949) have devised a process of recovering uranium and also making monocalcium phosphate, a valuable fertilizer product. The inventors treat phosphate rock with hot recycle phosphoric acid to obtain a monocalcium phosphate solution and a residue which is filtered off and discarded. On cooling the filtrate they obtain monocalcium phosphate crystals which they filter off. They treat the mother liquor from this filtration with sulfuric acid to obtain phosphoric acid and gypsum, discarding the latter.

They finally reduce the uranium in the phosphoric acid with iron and precipitate $UF_4$ with hydrofluoric acid. The $UF_4$ precipitate is described as bulky and slimy. The authors have concluded that the process is not practical because of high uranium losses to the monocalcium phosphate solid and because of numerous filtration problems.

It is the object of the present invention to recover uranium in a concentrated form from wet-process acid as an easily filterable solid which is free from objectionable organic material.

It is another objective of the present invention that the uranium-bearing solid be acid soluble to facilitate further uranium purification by solvent extraction.

It is still another objective of the present invention that the phosphoric acid be recovered essentially intact.

A further objective of the present invention is that it be applicable to all black or green wet-process acids.

A further objective of the present invention is that the phosphoric acid be recovered in a concentrated form substantially free of impurities.

McCullough et al (U.S. Pat. No. 3,975,178) have described a method of purifying wet-process merchant-grade phosphoric acid whereby they first treat the acid with a small amount of ammonia, then with methanol. This treatment precipitates most of the objectionable impurities from the phosphoric acid. The precipitate is partially water soluble and almost completely soluble in acid. While the exact nature of the precipitate is unknown, the impurities are perhaps in the form of complex metal phosphates and hexafluorosilicates.

The inventors separate the solids from the methanol-phosphoric acid mixture, then distill the methanol away from the purified acid. This process produces purified concentrated phosphoric acid with almost no loss of methanol. Unfortunately, the above treatment does not quantitatively precipitate uranium since some uranium is in the hexavalent state.

We have overcome the aforementioned disadvantages of recovering uranium from phosphoric acid by deviating from the teachings of McCullough, et. al., (Ibid.). In our invention we treat the phosphoric acid with ammonia or an ammonium salt along with or followed by a reducing agent such as iron, zinc, or aluminum. Heating speeds up the dissolution of the reducing agent but is not absolutely necessary. Following this, we precipitate the impurities from the acid with methanol. Unlike McCullough's method, however, we completely precipitate the uranium from the phosphoric acid. We use distillation to separate methanol from the uranium free, purified phosphoric acid. The uranium-bearing solid is soluble in mineral acids which thus allows further uranium purification and concentration by conventional solvent extraction techniques. Organic material which is in the impure acid follows the purified acid and therefore does not interfere with subsequent solvent extraction.

It is possible by using optimum conditions to achieve complete precipitation of uranium from the wet-process phosphoric acid. Any chemical reducing agent which reduces U(VI) to U(IV) is suitable. Preferred reducing agents are zinc dust, aluminum dust, or iron powder. Electrolytic reduction should be suitable also. The amount of reducing agent used should be sufficient to reduce all uranium to the tetravalent state. In practice, it is desirable to add excess reducing agent to ensure this. Reducing agent may be dissolved in the acid cold, but the reaction proceeds faster if the acid is heated to 50° to 100° C.

The amount of ammonia required to give satisfactory results may vary over a wide range. The actual amount is dependent somewhat on the amount of methanol used in that the use of lesser amounts of ammonia may be compensated for by using larger amounts of methanol. Ammonia gas is convenient to use, but ammonium salts work equally well. A range of 0.05 g atom of nitrogen/g atom phosphorus up to 0.20 g atom N/g atom P gave satisfactory results. After the addition of reducing agent and ammonia to the acid, we heat the acid to about 70° C. and add methanol. The reaction mixture is refluxed for about 30 minutes and the solids filtered off. A range of 1.9 lb methanol/lb phosphoric acid up to 3.2 lb methanol/lb phosphoric acid precipitated nearly 100 percent of the uranium from the phosphoric acid.

A larger amount of methanol should work equally well but it is not required. The lowest amount of methanol which will give satisfactory results will depend in part on the amount of ammonia used. In general, reducing the amount of methanol will reduce the uranium recovery, but this can be compensated for by using more ammonia. While 1.9 pounds methanol/lb phosphoric acid was the lowest ratio tested, a ratio of 1.0 should work equally well if a correspondingly larger amount of ammonia is used. The time that the reaction mixture is refluxed is not critical and 30 to 45 minutes gives good results. Although only methanol was tested, it is obvious to those skilled in the art that other miscible solvents such as ethanol, isopropyl alcohol, or acetic acid should work equally well.

An advantage of our invention over previously discussed prior art is that it is suitable for use with the more concentrated merchant-grade acids. A further advantage is that the invention can be used on black acids with no pretreatment. The organic material does not interfere with the precipitation or subsequent solvent extraction. Still another advantage is that the uranium is recovered in an acid-soluble concentrated form which is free from emulsion-forming organic materials. The uranium-bearing solid may therefore be dissolved in an acid amenable to uranium solvent extraction, such as sulfuric acid. Because no emulsion-forming materials precipitate with the uranium-bearing solid, solvent disengaging is improved and solvent losses are lowered. Another advantage of our invention is that the treated acid is not only uncontaminated by process chemicals or solvent extractants, but it is actually more pure than the untreated acid.

Such purified acids will command a premium price because they have lower viscosities, they are not subject to postprecipitation of objectionable sludge, and they may be used for liquid fertilizers. The grade and quality of solid fertilizer products made from such purified acids is improved also because citrate insoluble phosphates are absent from the product.

This invention, together with further objects and advantages thereof, will be better understood from a consideration of the following description taken in connection with the accompanying drawings in which:

FIG. 1 is a flowsheet illustrating the principles of our invention.

Figure 2:
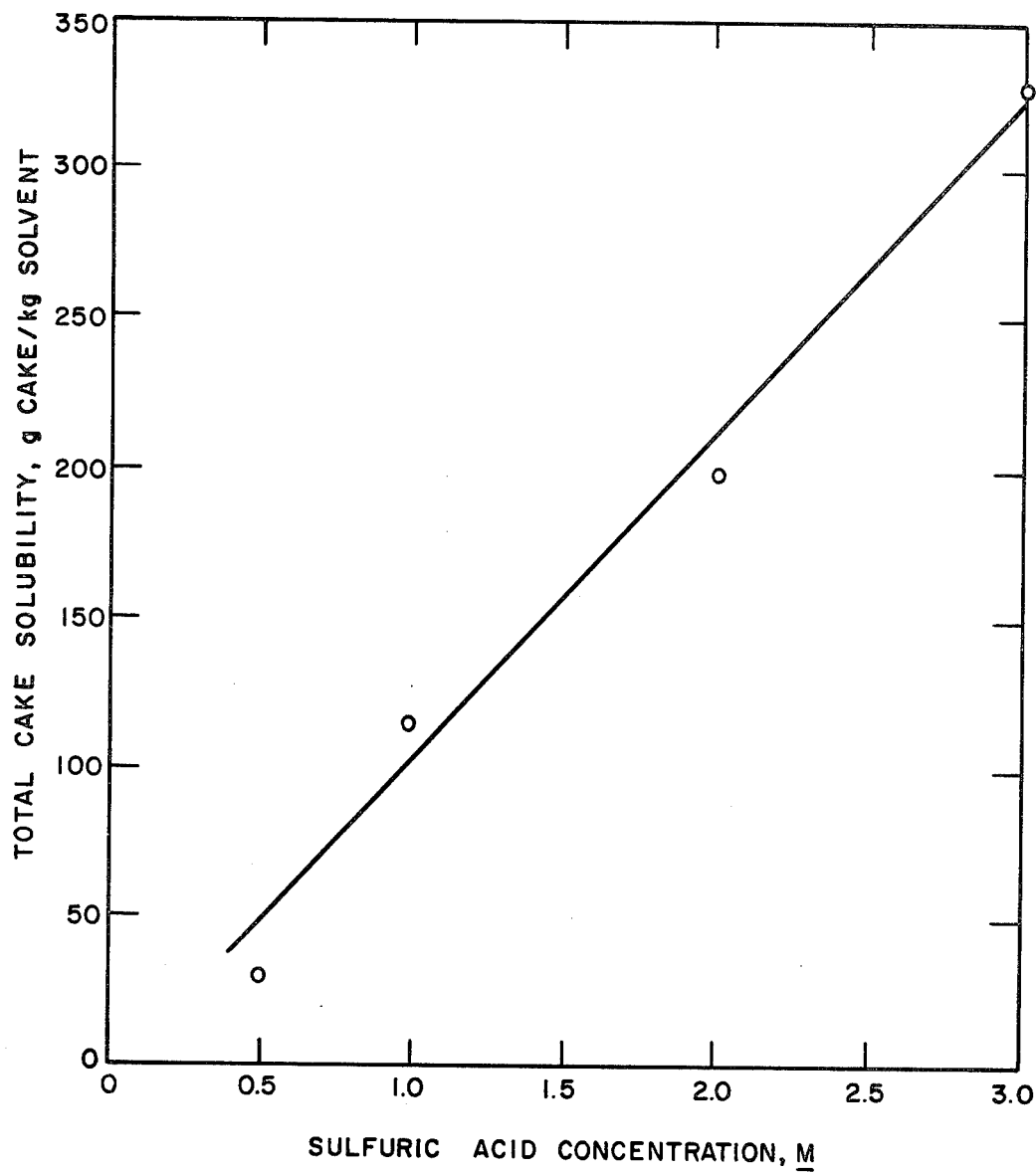

FIG. 2 describes the effect of sulfuric acid concentration on the solubility of the methanol precipitated cake. This figure is discussed in more detail in Example XVIII, infra.

Referring now more specifically to FIG. 1, phosphoric acid, ammonia, and a reducing agent, such as zinc dust from sources not shown, are fed into reactor 1 via lines 2, 3, and 4. Reactor 1 is equipped with a motor-driven agitator, not shown, running at such speed as to secure rapid and intimate mixing of the phosphoric acid, zinc, and ammonia. Supplemental heat, not shown, may be added, if desired. Following dissolution of the zinc in the phosphoric acid, the mixture is passed into reactor 5 via line 6 where it is blended with methanol derived from a source later described. Reactor 5 is equipped also with a motor-driven agitator, not shown, running at such speed so as to secure rapid and intimate mixing of the methanol, phosphoric acid, and precipitated solids. Sufficient heat from a source not shown is supplied to reactor 5 to keep the mixture at or near reflux. Reactor 5 is also equipped with a water-cooled condenser, not shown, so that condensed offgas may be returned to the reaction mixture.

Following a short period of refluxing, the slurry in reactor 5 is sent via line 7 to filtration unit 8 where solids are separated from the mother liquor. Filtration, centrifugation, or other methods of liquid-solid separation may be used in this filtration unit 8.

The filtrate, which is a mixture of purified phosphoric acid and methanol, is sent to a distillation unit 9 via line 10 where methanol and water are removed by simple distillation. Purified superphosphoric acid is recovered for conversion to premium-grade fertilizer products. The distillate, which is a mixture of water and methanol, is sent via line 11 to a rectification unit 12 where methanol and water are separated. Water is discarded and methanol returned to the process via line 13.

The uranium-bearing solid from filtration unit 8 is sent to washer unit 14 via line 15 where the solid is washed free of adhering phosphoric acid with methanol delivered via line 16. The wash solution is returned to the process via line 17 and the solid then sent to drying unit 18 via line 19 where methanol adhering to the solid is removed. The dry uranium-bearing solid is then sent via line 20 to solvent extraction unit 21 where the solid is dissolved in acid and the uranium recovered by solvent extraction.

Offgas from drying unit 18 is largely methanol. This offgas is sent via line 22 to condenser 23 and then back to reactor 5 via line 24.

In order that those skilled in the art may better understand how the present invention can be practiced, the following examples are given by way of illustration but not by way of limitation. Two series of tests were used to measure the effect of reduction, weight ratio methanol:phosphoric acid, and atom ratio nitrogen:phosphorus on uranium precipitation. In series one (Examples I through VII), uranium is reduced with zinc, and in series two (Examples VIII through XII), uranium is oxidized with hydrogen peroxide.

EXAMPLE I

To a 500 ml three-necked flask, 100 g of black wet-process phosphoric acid having the following composition:

| Phosphoric Acid Composition, Weight Percent | | | | | | |
|---|---|---|---|---|---|---|
| $P_2O_5$ | Iron | Aluminum | Magnesium | Fluorine | Sulfate | Uranium |
| 53.8 | 0.65 | 0.53 | 0.16 | 0.43 | 3.73 | 0.0209 | was added. Also added were 0.40 g of powdered zinc and 2.99 g of ammonium bicarbonate. The flask was equipped with a water cooled condenser, Tru-Bore stirrer, and thermometer. The mixture was warmed to 65° C. for 15 minutes with stirring to dissolve the zinc and ammonium bicarbonate. Then 144 g of methyl alcohol was added and the mixture refluxed for an additional 30 minutes. The precipitated solids were filtered from the hot alcoholic phosphoric acid mixture, washed with 150 ml of methyl alcohol, then dried in air. Analysis showed that the solid contained 0.0031 g of uranium (15 percent of input).

In all cases a spectrophotometric analytical method was used to determine uranium [Florence, T. M. and Farrar, Y. J., *Anal. Chem.* 42, (2) 271 (1970)]. The precision of this method is approximately ±5 percent (one standard deviation) of the absolute value. Recoveries of uranium in excess of 100 percent of input are due to cumulative errors in the analysis of the starting material and the methanol precipitated cake.

EXAMPLE II

The procedure in Example I was repeated with the same acid except that 11.97 g of ammonium bicarbonate was used. Analysis of the dried solid showed that it contained 0.0209 g of uranium (100 percent of input).

EXAMPLE III

The procedure of Example I was repeated except that 234 g of methanol and 2.99 g of ammonium bicarbonate were used. The solid contained 0.0167 g of uranium (80 percent of input).

EXAMPLE IV

The procedure of Example I was repeated except that 234 g of methanol and 11.98 g of ammonium bicarbonate were used. Analysis indicated that the solid contained 0.0224 g of uranium (107 percent of input).

EXAMPLE V

The procedure of Example I was repeated except that 183 g of methanol and 7.49 g of ammonium bicarbonate were used. The solid contained 0.0205 g of uranium (98 percent of input).

EXAMPLE VI

The procedure of Example V was repeated. The solid contained 0.0211 g of uranium (101 percent of input).

EXAMPLE VII

The procedure of Example V was repeated. The solid contained 0.0191 g of uranium (91 percent of input).

EXAMPLE VIII

The procedure of Example I was repeated except that 1.0 ml of 30 percent hydrogen peroxide was used in place of the zinc metal; 144 g of methanol and 2.99 g of ammonium bicarbonate were used. The solid contained 0.0010 g of uranium (5 percent of input).

EXAMPLE IX

The procedure of Example VIII was repeated except that 144 g of methanol and 11.98 g of ammonium bicarbonate were used. The dried solid contained 0.0077 g of uranium (37 percent of input).

EXAMPLE X

The procedure of Example VIII was repeated except that 235 g of methanol and 2.99 g of ammonium bicarbonate were used. The solid contained 0.0029 g of uranium (14 percent of input).

EXAMPLE XI

The same procedure as Example VIII was used except that 235 g of methanol and 11.98 g of ammonium bicarbonate were used. The solid contained 0.0071 g of uranium (34 percent of input).

EXAMPLE XII

The same procedure as Example VIII was used except that 176 g of methanol and 7.49 g of ammonium bicarbonate were used. The solid contained 0.0073 g of uranium (35 percent of input).

EXAMPLE XIII

Results from Examples I through XII were fitted to a quadratic equation by multiple linear regression. The regression showed that methanol:phosphoric acid weight ratio, ammonia:phosphoric acid mole ratio, and oxidation state had a significant influence (95 percent confidence level) on uranium precipitation. Within the operating conditions of the invention, 100 percent of the uranium was recovered in the solid precipitate when zinc was added while 37 percent or less of the uranium precipitated when the uranium was in the oxidized state.

EXAMPLE XIV

The experimental procedure of Example I was used with a black phosphoric acid having the following composition:

| Phosphoric Acid Composition, Weight Percent | | | | | |
|---|---|---|---|---|---|
| $P_2O_5$ | Iron | Aluminum | Magnesium | Fluorine | Uranium |
| 50.7 | 0.97 | 1.2 | 0.38 | 1.8 | 0.0314 |

To 100 g of this acid was added 10.16 g of ammonium bicarbonate and 0.4881 g of iron powder. The mixture was heated for one hour at 65° C., then 177 g of methanol was added over a period of 20 minutes. The mixture was refluxed for 45 minutes, then filtered hot.

The cake was washed with 150 ml of methanol and then dried at 66° C. for two hours to yield 18.30 g. Analysis of the cake showed that it contained 0.033 g of uranium (105 percent recovery).

EXAMPLE XV

The procedure of Example XV was used except that 0.157 g of aluminum turnings were used instead of iron. The cake weighed 22.41 g and contained 0.031 g of uranium (99 percent recovery).

EXAMPLE XVI

The procedure of Example XV was used except that 0.569 g of zinc dust were used rather than iron. The cake weighed 21.52 g and contained 0.034 g of uranium (108 percent recovery).

EXAMPLE XVII

For purposes of comparison, the same treatment as used in Example XV was made except that no reducing agent was added. The cake weighed 27.71 g and contained 0.017 g of uranium (54 percent recovery).

EXAMPLE XVIII

To determine the effect of sulfuric acid concentration on the solubility of the precipitate under mild oxidizing conditions, 10 grams of the precipitate was slurried with 50 ml of sulfuric acid of various concentrations along with 1 ml of 30 percent hydrogen peroxide. The composition of the precipitate used in these tests is shown below.

| Methanol Precipitated Solid Composition, Weight Percent | |
|---|---|
| Specie | Concentration, wt % |
| $P_2O_4$ | 46.3 |
| Ammonium | 6.4 |
| Sulfate | 3.3 |
| Calcium | 0.29 |
| Magnesium | 1.1 |
| Aluminum | 4.5 |
| Iron | 6.4 |
| Fluorine | 5.5 |
| Vanadium | 0.019 |
| Uranium | 0.145 |

Oxidizing conditions were chosen to ensure that uranium was in a form amenable to solvent extraction by di-(2-ethylhexyl) phosphoric acid, a commonly used uranium extractant. Additional sulfuric acid was added in increments (30 minutes or more between increments) until all except a trace of gray material was left. Results are found in FIG. 2.

After sifting and winnowing through the data supra, it becomes obvious that uranium must be in a reduced form before it can be completely precipitated from phosphoric acid by addition of methanol and ammonia. An acceptable method of achieving this valence adjustment is by the addition of a metallic reducing agent such as metallic zinc, aluminum or iron. The acceptable range of other variables in the process are shown below:

| Variable | Preferred Range |
|---|---|
| Weight ratio methanol:phosphoric acid | 1.93–3.15 |
| Atom ratio nitrogen:phosphorus | 0.05–0.2 |

EXAMPLE XIX

Ten grams of the filter cake described in Example XVIII were mixed with 489 g of 0.5 M $H_2SO_4$ for 30 minutes at 25° C. A small amount of insoluble matter, <0.1 g, was filtered off and 1 ml of 30 percent hydrogen peroxide added to the filtrate. The hydrogen peroxide caused the green filtrate to turn orange.

Twenty-five ml of this solution was shaken at 25° C. with 25 ml of 0.146 M di-(2-ethylhexyl) phosphoric acid dissolved in kerosene for five minutes then allowed to stand. Phases disengaged in less than 60 seconds. Analysis of the aqueous and organic phases showed that 83 percent of the uranium was extracted into the organic phase in one contact.

EXAMPLE XX

The procedure of Example XIX was followed except that 5 g of filter cake were dissolved in 494 g of 0.5 M $H_2SO_4$ and 1 ml of 30 percent hydrogen peroxide. Twenty-five ml of this solution were contacted with 25 ml of 0.0937 M di-(2-ethylhexyl) phosphoric acid dissolved in kerosene. Contact time was 5 minutes and phases disengaged in less than 60 seconds. Analysis of aqueous and organic phases showed that 74 percent of the uranium, initially in the aqueous phase, was extracted into the organic phase.

What we claim as new and desire to secure by Letters Patent of the United States is:

1. A process for recovering uranium in a concentrated form from wet-process phosphoric acid by the use of ammonia or an ammonium salt, or both, a reducing agent, and a water-miscible solvent, which comprises the steps of:
    A. mixing wet-process phosphoric acid with an ammonium salt or ammonia, or both, while maintaining the temperature of the reaction mixture between about 20° C. and about 100° C. for a period of time necessary to dissolve said ammonium salt or ammonia, or both, and reducing agent, wherein for each mole of orthophosphoric acid in said acid, about 0.05 to about 0.20 mole of ammonium salt or ammonia, or both, are used, and for each gram atom of iron present in said wet-process acid, one gram equivalent weight of reducing agent is used;
    B. mixing a miscible solvent into the reaction mixture from step A supra while maintaining the temperature between 50° C. and reflux temperatures wherein for each pound of orthophosphate in said reaction mixture, about 1.93 to about 3.15 pounds of miscible solvent are used;
    C. separating solids from liquid in said reaction slurry from step B, supra;
    D. washing said solids from step C supra with sufficient miscible solvent to remove phosphoric acid from the precipitate;
    E. recycling said miscible solvent wash mixture from step D supra to later-mentioned step K;
    F. drying washed solids from step D, supra;
    G. condensing offgas from step F, supra, and returning said condensate back to step B, supra;
    H. dissolving said solids from step F supra in mineral acid;
    I. recovering uranium in the solution from step H, supra, by solvent extraction;
    J. distilling water and miscible solvent from the filtrate from step C supra; and
    K. rectifying miscible solvent and water from step J, supra, discarding water, and returning miscible solvent back to step B, supra.

2. The process of claim 1 wherein the miscible solvent is selected from a group consisting of methyl alcohol, ethyl alcohol, isopropyl alcohol, and mixtures thereof.

3. The process of claim 1 wherein the ammonium containing compound is selected from a group consisting of ammonia, ammonium bicarbonate, and mixtures thereof.

4. A process for precipitating uranium in a concentrated form from wet-process phosphoric acid by use of ammonium bicarbonate, methanol, and a reducing agent selected from a group consisting of iron, zinc, and aluminum, which comprises the steps of:

A. mixing phosphoric acid with ammonium bicarbonate and reducing agent while maintaining the temperature of the reaction mixture between about 20° C. and about 100° C. for a period of time necessary to dissolve said ammonium bicarbonate and reducing agent, wherein for each mole of orthophosphoric acid in said wet-process acid, about 0.05 to about 0.20 moles of ammonium bicarbonate are used and for each gram atom of iron present in said wet-process acid, one gram equivalent weight of reducing agent is used;

B. mixing methanol into the reaction mixture from step A, supra, wherein for each pound of orthophosphate in said reaction mixture, about 1.93 to about 3.15 pounds of methanol are added while maintaining the temperature of the reaction mixture between about 50° C. and reflux temperature;

C. separating solids from liquid in said reaction slurry from step 3, supra;

D. washing said solids from step C, supra, with sufficient methanol to remove phosphoric acid from the precipitate;

E. recycling said methanol wash mixture from step D, supra, to later-mentioned step K;

F. drying washed solids from step D, supra;

G. condensing offgas from step F, supra, and returning said condensate back to step B, supra;

H. dissolving said solids from step F supra in sulfuric acid;

I. recovering uranium in the solution from step H, supra, by solvent extraction;

J. distilling water and methyl alcohol from step C, supra; and

K. rectifying methanol and water from step J, supra, discarding water, and returning methanol back to step B, supra.

5. A process for precipitating uranium in a concentrated form from wet-process phosphoric acid by use of ammonium bicarbonate, methanol, and a reducing agent selected from a group consisting of iron, zinc, and aluminum, which comprises the steps of:

A. mixing phosphoric acid with ammonium bicarbonate and reducing agent while maintaining the temperature of the reaction mixture between about 20° C. and about 100° C. for a period of time necessary to dissolve said ammonium bicarbonate and reducing agent, wherein for each mole of orthophosphoric acid in said wet-process acid, about 0.05 to about 0.20 moles of ammonium bicarbonate are used and for each gram atom of iron present in said wet-process acid, one gram equivalent weight of reducing agent is used;

B. mixing methanol into the reaction mixture from step A, supra, wherein for each pound of orthophosphate in said reaction mixture, about 1.93 to about 3.15 pounds of methanol are added while maintaining the temperature of the reaction mixture between about 50° C. and reflux temperature;

C. separating solids from liquid in said reaction slurry from step 3, supra;

D. washing said solids from step C, supra, with sufficient methanol to remove phosphoric acid from the precipitate;

E. recycling said methanol wash mixture from step D, supra, to later-mentioned step K;

F. drying washed solids from step D, supra;

G. condensing offgas from step F, supra, and returning said condensate back to step B, supra;

H. dissolving said solids from step F, supra, in mineral acid;

I. recovering uranium in the solution from step H, supra, by solvent extraction;

J. distilling water and methyl alcohol from step C, supra; and

K. rectifying methanol and water from step J, supra, discarding water, and returning methanol back to step B, supra.

* * * * *